(12) United States Patent
Lamping et al.

(10) Patent No.: US 6,869,386 B2
(45) Date of Patent: Mar. 22, 2005

(54) METHOD FOR MANUFACTURING DISCRETE ARTICLES FROM A MATERIAL WEB USING SYNCHRONIZED SERVO-ACTUATED OPERATIONAL UNITS

(75) Inventors: Michael Joseph Lamping, Colerain Township, OH (US); Mark Wayne Morrow, Milford, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 103 days.

(21) Appl. No.: 10/180,227

(22) Filed: Jun. 26, 2002

(65) Prior Publication Data

US 2004/0005974 A1 Jan. 8, 2004

(51) Int. Cl.[7] .................................................. B31B 1/00
(52) U.S. Cl. ............................................. 493/3; 493/34
(58) Field of Search ............................ 493/3, 22, 29, 493/34, 194, 199, 236

(56) References Cited

U.S. PATENT DOCUMENTS

| | | | |
|---|---|---|---|
| 3,629,861 A | * 12/1971 | Marsh et al. .............. | 358/1.11 |
| 4,095,158 A | 6/1978 | Matsumoto | |
| 4,264,850 A | 4/1981 | Cannon et al. | |
| 4,506,321 A | 3/1985 | Comstock et al. | |
| 4,574,566 A | * 3/1986 | Eaves et al. .................. | 53/450 |
| 4,810,941 A | 3/1989 | Ohishi et al. | |
| 4,837,715 A | 6/1989 | Ungpiyakul et al. | |
| 5,041,070 A | * 8/1991 | Blaser ......................... | 493/14 |
| 5,045,135 A | 9/1991 | Meissner et al. | |

(List continued on next page.)

FOREIGN PATENT DOCUMENTS

| | | |
|---|---|---|
| EP | 0 630 723 A2 | 12/1994 |
| EP | 0 589 859 B1 | 4/1998 |
| JP | 2001331222 | 11/2001 |
| WO | WO 95/32694 | 12/1995 |
| WO | WO 95/32695 | 12/1995 |
| WO | WO 95/32696 | 12/1995 |
| WO | WO 96/23470 | 8/1996 |
| WO | WO 96/33054 | 10/1996 |
| WO | WO 00/38606 | 7/2000 |
| WO | WO 00/40195 | 7/2000 |
| WO | WO 00/40196 | 7/2000 |
| WO | WO 00/42960 | 7/2000 |
| WO | WO 00/59428 | 10/2000 |
| WO | WO 00/59429 | 10/2000 |
| WO | WO 01/56523 A1 | 8/2001 |
| WO | WO 01/56524 A1 | 8/2001 |
| WO | WO 01/56524 | 8/2001 |
| WO | WO 01/66450 | 9/2001 |
| WO | WO 01/66453 A2 | 9/2001 |

Primary Examiner—Eugene Kim
(74) Attorney, Agent, or Firm—Michael P. Hayden; Jay A. Krebs; Ken K. Patel

(57) ABSTRACT

Method for manufacturing discrete articles from a material web using a cyclic master reference signal to synchronize the servo actuation of multiple operational units in a manufacturing apparatus to perform periodic operations on successive product segments of the material web and thereby form the articles, without the need for ongoing external phasing or registration to maintain synchronization of the operational units relative to the articles being made. The method is particularly suited for application in the manufacture of disposable absorbent articles and other products formed from web materials. Because of the coordination by a common reference signal, the execution by each of the individual servo systems of its programmed actuation instructions results in its actuation being synchronous with that of the other servo systems. These actuation instructions can include motion profiles, torque profiles, force profiles, "cam" profiles, and any other form of actuation sequence within the capability of servo actuators.

18 Claims, 7 Drawing Sheets

U.S. PATENT DOCUMENTS

| | | | |
|---|---|---|---|
| 5,235,515 A | | 8/1993 | Ungpiyakul et al. |
| 5,286,543 A | | 2/1994 | Ungpiyakul et al. |
| 5,383,988 A | | 1/1995 | Herrmann et al. |
| 5,412,623 A | * | 5/1995 | Asada et al. ................ 367/190 |
| 5,636,558 A | | 6/1997 | Sanders et al. |
| 5,689,942 A | | 11/1997 | Suga |
| 5,766,406 A | | 6/1998 | Bohn et al. |
| 5,868,899 A | | 2/1999 | Gundersen |
| 5,923,132 A | | 7/1999 | Boyer |
| 5,966,908 A | | 10/1999 | Philipp et al. |
| 6,006,637 A | | 12/1999 | Sanders et al. |
| 6,101,912 A | | 8/2000 | Sanders et al. |
| 6,133,705 A | | 10/2000 | Inoue et al. |
| 6,149,565 A | * | 11/2000 | Meyer et al. ................. 493/22 |
| 6,149,755 A | | 11/2000 | McNichols et al. |
| 6,165,306 A | | 12/2000 | Rajala |
| 6,224,699 B1 | | 5/2001 | Bett et al. |
| 6,246,201 B1 | | 6/2001 | Aderek et al. |
| 6,260,188 B1 | | 7/2001 | Ungpiyakul et al. |
| 6,264,591 B1 | * | 7/2001 | Keen et al. .................... 493/4 |
| 6,273,313 B1 | | 8/2001 | Noll et al. |
| 6,416,453 B1 | * | 7/2002 | Simonetti et al. ........... 493/269 |
| 6,450,321 B1 | | 9/2002 | Blumenthal et al. |
| 6,475,128 B1 | * | 11/2002 | Wallace et al. ................ 493/8 |

* cited by examiner

METHOD FOR MANUFACTURING DISCRETE ARTICLES FROM A MATERIAL WEB USING SYNCHRONIZED SERVO-ACTUATED OPERATIONAL UNITS

FIELD OF THE INVENTION

This invention relates to a method for manufacturing discrete articles from a material web using a cyclic master reference signal to synchronize multiple servo-actuated operational units of a manufacturing apparatus, without the need for ongoing external phasing or registration to maintain synchronization of the operational units relative to the articles being made.

BACKGROUND OF THE INVENTION

Several methods have been used to achieve the motions, torques, and forces for the cyclic operations required to form individual finished articles in a manufacturing apparatus made up of multiple operational units performing successive operations on web materials. For example, in the manufacture of disposable absorbent articles, a common approach is to first form a composite product web and then individual finished articles. A main web is typically advanced in a machine direction and secondary webs and/or discrete components are applied to the main web to form a composite web, from which the discrete finished products are eventually severed. For the formation and application of discrete components, a slower secondary web is often made to slip or slide on a surface moving at a speed close to that of the composite product web and each discrete component is detached and then accelerated due to the movement of the surface. By phasing the detachment, the components can be approximately phased relative to the pre-determined portions of the composite product web corresponding to the individual products to be formed from the product web. However, the equipment for slipping and cutting the secondary web is typically suitable for only a limited range of pitch length of the finished product. Outside this range, the mismatch between the speed of the surface on which the secondary web slips and the speed of either the secondary web or the composite product web is too great for reliable operation. Therefore, when it is desired to make a product with a different pitch length outside the range of suitability of a particular piece of equipment, often the entire operational unit must be replaced with one designed for the different product pitch length. The synchronization of the discrete component is typically performed via an external registration system or by means of a system in which an external automatic or operator-assisted feedback control system is used to adjust the phase of the operational unit or of the main web to achieve proper placement.

For the cutting and removal of portions of materials, and for the severance of individual finished products, the operational units are often similarly limited in the range of product pitch lengths for which they are suitable. Although cuts can be made with moderately mismatched web and cutter speeds, the magnitude of tolerable mismatch is restricted by the thickness of the portion of the composite product web being cut, the thickness of adjacent portions, the fragility of the material being cut, and other factors. Therefore, for product pitch changes, it is common to replace rolls and operational units performing these process functions. Synchronization of these cutting operations is also typically achieved by a phasing action via an automatic or operator-assisted control system.

In many manufacturing apparatuses, the operational units are driven from one or more mechanical line shafts. This approach makes it possible to establish and maintain the synchronization of several operational units. However, this approach has the disadvantages of relative inflexibility. For instance, changes in the product pitch length, size, or design, often require changes in ratios that, in turn, require changes in the mechanical power transmission equipment, such as the substitution of several gears or pulleys. Also, since power transmission equipment that is designed for relatively easy changes of the above type often has numerous components requiring relatively precise setup, the costs of the setup, adjustment, maintenance, and replacement of such equipment may be high.

Servo motors and programmable controllers have been applied in attempts to address the above described interrelated process and equipment issues. However, the uses of servos on these types of manufacturing lines have typically been limited to web-based operational units achieving synchronization via registration systems with line shaft speed generation reference signals being used to provide the velocity references for one or more servo motors. In some applications, position based synchronization of operational units relative to the product position has been achieved via timing-based systems tied with external sensors. For example, servo technology has been used to accelerate and decelerate rolls in time-based control schemes and to dynamically adjust registration with respect to sensed marks on the product web.

The previous approaches to using servo technology fail to fully address the need for the synchronization of cyclic operations over a wide range of product pitch lengths, sizes, and designs, without the need for duplicate operational units for different products and with the flexibility of a fully servo driven manufacturing apparatus not requiring a line shaft.

Thus, the need exists for a practical method for the synchronization of a plurality of servo actuators, and in particular a method that provides the necessary coordination of the servo actuation to X, Y and Z coordinates of a composite web from which individual discrete finished products are being formed.

BRIEF SUMMARY OF THE INVENTION

The present invention provides a method for manufacturing discrete articles from a material web using a cyclic master reference signal to synchronize the servo actuation of multiple operational units in a manufacturing apparatus to perform periodic operations on successive product segments of the material web and thereby form the articles. The method is particularly suited for application in the manufacture of disposable absorbent articles and other products formed from web materials and it is primarily in this context that the present invention is herein described. Because of the coordination by a common reference signal, the execution by each of the individual servo systems of its programmed actuation instructions results in its actuation being synchronous with that of the other servo systems. These actuation instructions can include motion profiles, torque profiles, force profiles, cam profiles, and any other form of actuation sequence within the capability of servo actuators.

An overriding consideration in the manufacture of disposable absorbent articles is the cost of manufacturing the articles, including the costs of equipment changeover. The present invention provides a method which can be used for manufacturing absorbent articles of different sizes and of different designs with few or no duplicate operational units and little or no time required for changes in product size or for reestablishing stable operation after such changes. Thus, absorbent articles manufactured by the method of the present invention may be provided at a relatively lower cost than absorbent articles that are manufactured using other methods of control of operational units.

BRIEF DESCRIPTION OF THE DRAWINGS

While the specification concludes with claims particularly pointing out and distinctly claiming the subject matter which is regarded as the present invention, it is believed that the invention will be better understood from the following description taken in conjunction with the accompanying drawings, in which:

DETAILED DESCRIPTION OF THE INVENTION

Figure 1:
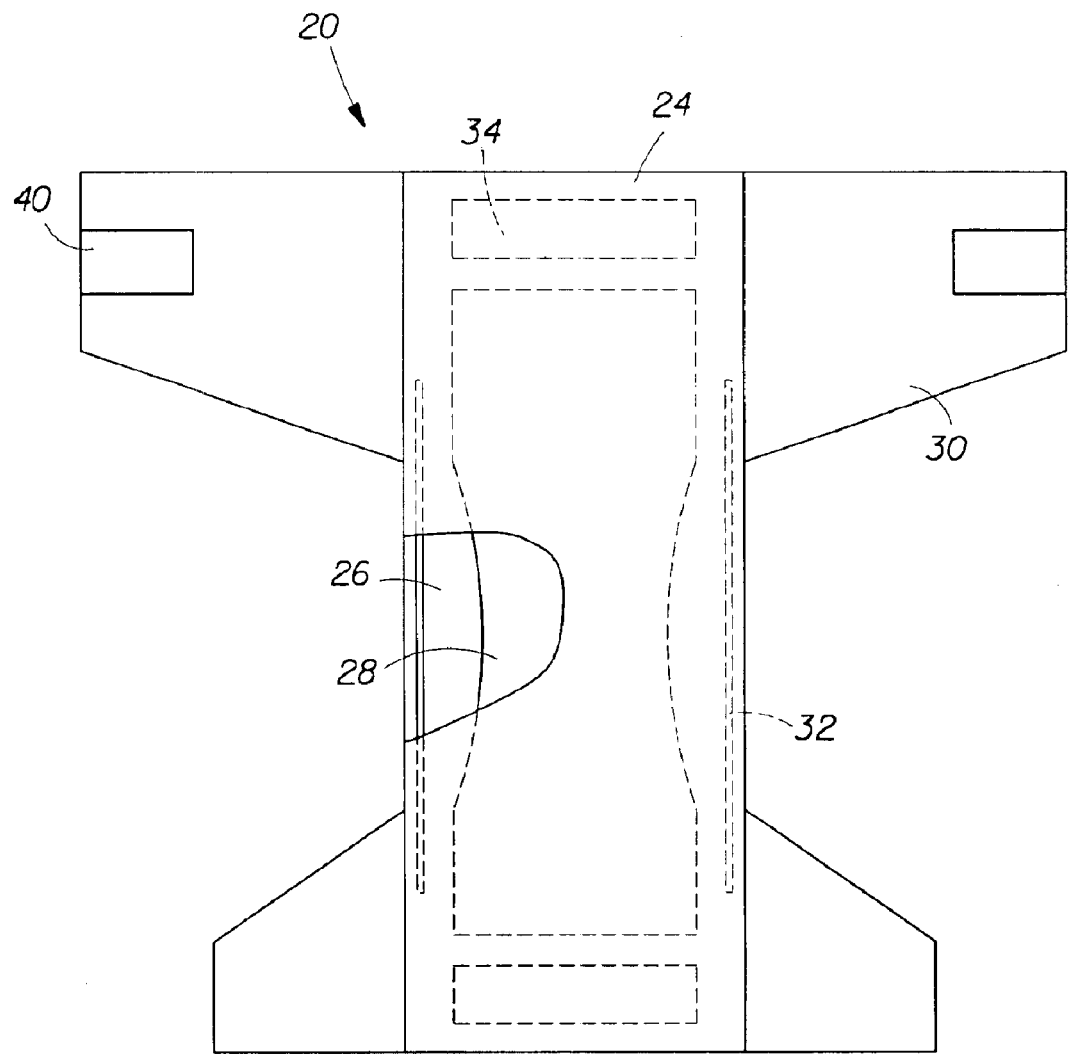
FIG. 1 shows a simplified plan view of a diaper embodiment of a disposable absorbent article that may be manufactured by the method of the present invention, with the topsheet side facing toward the viewer and selected portions cut away to reveal underlying structure.

The following definitions of terms may be useful for understanding the disclosure of the present invention.

Unitary disposable absorbent article: An article that is formed from separate parts united together to form a coordinated entity so that they do not require separate manipulative parts, such as a separate holder and liner, that is intended to be discarded after use, and that absorbs and contains body exudates, and more specifically, is an article which is placed against the skin of a wearer to absorb and contain the various exudates discharged from the body.

Diaper: An exemplary unitary disposable absorbent article typically worn by infants and incontinent persons; generally worn about the lower torso of the wearer.

Operational unit: A portion of a manufacturing apparatus serving to perform an operation to form the article being manufactured, typically by producing force and/or motion; also known as unit operation.

Servo system: An arrangement for producing mechanical power by means of a servo, typically including a servo controller and a servo actuator.

Actuator: A device for putting something into motion or action, especially for causing an operational unit to move, generate torque or exert a force.

Home: To reset to a determinate state, especially to reset a mechanism or an operational unit to a defined position or level of torque or force selected as its starting state; also, the state so selected.

Machine direction: The general direction of movement of the materials being processed, corresponding generally to an X direction or axis when referring to the product.

Cross machine direction: Both of the pair of opposing vectors defining an axis generally in the plane of the web material being processed and perpendicular to the machine direction, generally corresponding to a Y direction or axis when referring to the product.

Vertical direction: A direction generally orthogonal to both the machine direction and the cross machine direction, generally corresponding to a Z direction or axis when referring to the product.

Upstream: A position or a direction toward the earlier steps of the process, relative to another position, i.e., the opposite of downstream.

Downstream: A position or a direction toward the latter steps of the process, relative to another position, i.e., the opposite of upstream.

Phase: A point or stage within a cycle or period considered in relation to a standard position or starting point; also, to adjust the phase in relation to a reference cycle or period.

Phase-sensitive: Requiring synchronization with respect to phase, as well as with respect to period.

In phase: Having or being at the same phase; in a synchronized manner.

Phase to: To adjust the phase to match that of a reference cycle or period, especially that of an independent mechanism or operational unit.

Phase offset: The difference between the home state of an operational unit and the state in which the operational unit is in phase with a position reference for advancing product segments.

Phase shift: A difference between the phase at one point and that at another point in the manufacturing apparatus.

Period: A length of a cycle.

Period-sensitive: Requiring synchronization with respect to period, i.e., requiring completion once per reference cycle.

Product cycle: A complete performance by an operational unit of a periodic process on a product segment; one product cycle typically occurs for each successive advancement of one product segment.

Product segment: A portion of a product web corresponding to an individual finished product being formed.

Segment length: The machine direction length of a product segment under the instant process conditions; also known as the pitch or pitch length of a product.

Synchronize: To make synchronous, i.e., to make recur or operate at the same periods; to make have the same period and phase; some operations may be only period-sensitive, while others may be both period and phase-sensitive.

Determinate: Definitely or precisely determined or fixed; "known" to a monitoring device or controller.

Reference axis: A servo axis that an operational unit controller is programmed to follow.

Master reference: A servo axis serving either directly or indirectly as a reference axis for the synchronization of all servo actuators in a manufacturing apparatus; a reference axis providing a signal corresponding to the advancement of the product web.

Web: A continuous sheet or strip of a material, including woven or non-woven materials, films, tapes, etc.

The disclosures of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

The method of the present invention is particularly suited for use in the manufacture of articles from web materials, in which it is commonly necessary to position discrete components and to perform discrete operations in particular relationships with the segments of an advancing product web that will become individual finished products at the end of the overall manufacturing process. Therefore, for purposes of this description, specific reference will be made to the manufacture of disposable absorbent articles. A preferred embodiment of a unitary disposable absorbent article manufactured by the method of the present invention is the diaper 20 shown in FIG. 1. However, the method of the present invention is also applicable to the manufacture of other disposable absorbent articles such as incontinence briefs, diaper holders, feminine hygiene garments, training pants, pull-on pants, bibs, wipes, and the like, as well as to the manufacture of other types of articles from material webs.

With reference to FIG. 1, an absorbent article, such as diaper 20, generally comprises a liquid permeable topsheet 24 and a liquid impermeable backsheet 26. The diaper 20 also typically comprises discrete components such as an absorbent core 28 sandwiched between the topsheet 24 and the backsheet 26, elasticized leg cuffs 32, side panels 30, an elastic waist feature 34, and a fastening system 40. While the diaper 20 may be assembled in a variety of well-known configurations, preferred diaper configurations are described generally in U.S. Pat. No. 3,860,003 entitled "Contractible Side Portions for Disposable Diaper" issued to Kenneth B. Buell on Jan. 14, 1975; U.S. Pat. No. 5,151,092 issued to Buell on Sep. 9, 1992; and U.S. Pat. No. 5,221,274 issued to Buell on Jun. 22, 1993; and U.S. Pat. No. 5,554,145 entitled "Absorbent Article With Multiple Zone Structural Elastic-Like Film Web Extensible Waist Feature" issued to Roe et al. on Sep. 10, 1996; U.S. Pat. No. 5,569,234 entitled "Disposable Pull-On Pant" issued to Buell et al. on Oct. 29, 1996; U.S. Pat. No. 5,580,411 entitled "Zero Scrap Method For Manufacturing Side Panels For Absorbent Articles" issued to Nease et al. on Dec. 3, 1996; and U.S. Pat. No. 6,004,306 entitled "Absorbent Article With Multi-Directional Extensible Side Panels" issued to Robles et al. on Dec. 21, 1999.

Figure 2:
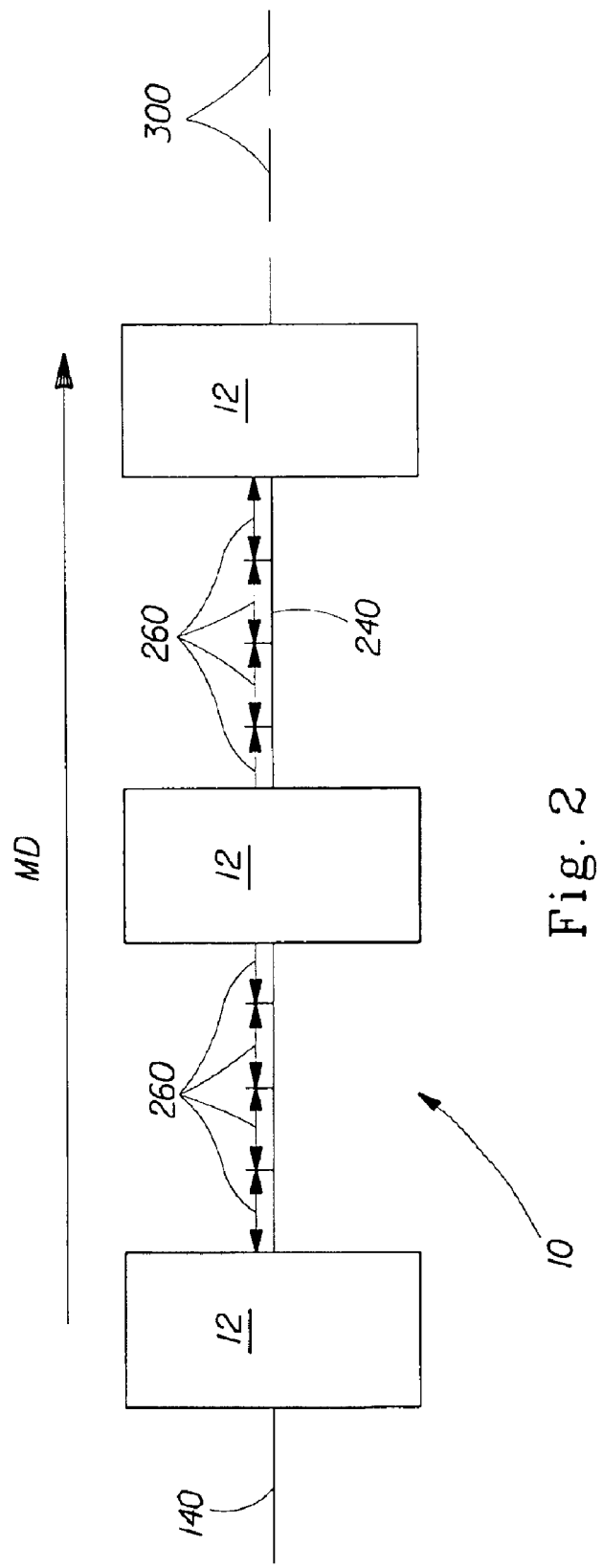
FIG. 2 shows a simplified schematic diagram of a manufacturing apparatus in which the present invention may be used.

The diapers 20 may be produced on the apparatus 10 shown schematically in FIG. 2. In a preferred embodiment of the apparatus, each of the webs of the materials making up the diaper 20 is fed into the apparatus 10 by a web delivery system, which is not shown in the drawings. As is well known in the art, the web delivery system preferably feeds the web into the apparatus 10 at a predetermined feed rate, while maintaining a predetermined level of tension.

Each web delivery system preferably comprises an unwinder system, a tensioning and metering system, and a tracking device. The tensioning and metering system preferably comprises a tensioning device, such as a dancer, a metering device, such as a powered roll or S-wrap roll pair, and a feedback system to control the speed of the unwinder system. Suitable web delivery systems are available from the Curt G. Joa Corporation of Sheboygan Falls, Wis., U.S.A. The tracking device preferably guides the web to place the centerline of the web exiting the tracking device at a predetermined lateral position. A tracking device manufactured by the Fife Corporation of Oklahoma City, Okla., U.S.A., under the trade designation Fife A9 is an example of a suitable tracking device.

Examining the process in greater detail, a main product web 140 of the material from which the diapers 20 are made is typically provided to the apparatus 10 in the machine direction. The machine direction is shown in FIG. 2 by the arrow MD, which points downstream along the machine direction. During the operation of the manufacturing apparatus 10, the main product web 140 is advanced in the machine direction such that product segments 260 successively move into and out of the operational units 12 which perform operations to form the individual discrete products 300.

As is known in the art, in typical manufacturing processes for disposable absorbent articles, such as diapers 20, additional materials in web form, as well as discrete components of various materials, are attached to the original web 140 in order to form a composite product web 240, from which the individual discrete products, such as finished diapers 20 are eventually severed. These manufacturing processes typically include cyclic operations that are performed once per product cycle on successive segments of the composite product web corresponding to the individual articles being manufactured or on portions of the additional materials or on discrete components. Some of the typical cyclic operations are functions that are sensitive to period, but not to phase. For example, the composite product web 240 may be advanced at a constant velocity by conveying devices that move a specified distance per product. The function of moving that distance is performed once per product period, but since the velocity is constant, it is not necessary to synchronize the conveying operational unit with respect to phase. Instead, it may be sufficient to simply actuate these operational units at a constant rate, i.e., to synchronize the actuation of these operational units with respect to period, only.

Conveying devices may also be actuated to perform cyclic functions including changes in velocity. For instance, a conveyor or a festoon device may be actuated to move faster or slower than the average velocity of the product web at various points in each product cycle, in order to advance or retard segments of the web. Such actuation may be desirable in manufacturing processes for splicing or for the application of discrete components that are fed in the cross machine direction, for example. Also, in some situations, successive product segments of the product web may be slowed for the application of the previously described shorter discrete components, to avoid the necessity of accelerating the discrete components by the full amount of the difference between their feed velocities and the average product web velocity.

Other cyclic operations must be regulated to occur in the proper positional relationship with respect to the segments of the composite product web corresponding to the individual products to be formed from the product web. In fact, these product segments typically are delimited by the most upstream operational unit that performs a phased operation and thereby initiates the formation of the composite product web. Thus, these functions are sensitive to both period and phase and so require synchronization with respect to both period and phase.

For the purposes of this disclosure, the phase reference for a phase-sensitive operational unit is the individual product segment of the product web present in that operational unit. Thus, for example, consider a discrete component that is to be applied at a point that is a specified distance from the leading edge toward the trailing edge of each product segment of the product web. Fundamentally, a corresponding operational unit, i.e., an operational unit serving to apply this discrete component, may be characterized as being in phase with the product web when it is phased so as to properly apply the component on each successive product segment. An adjacent operational unit serving to apply another discrete component may or may not instantaneously be in the identical mechanical, electrical, or logical state as the previously described operational unit when it is similarly properly in phase with the product web. For example, the instantaneous states of two operational units that are located 1.5 product segment lengths apart, each of which is properly in phase with advancing product segments in the product web, may be shifted in phase by one half cycle with respect to each other. However, regardless of any difference in state, matching the phase of two phase-sensitive operational units requires that each be adjusted to be in phase with respective product segments of the same product web. It may be noted that the difference in state between two operational units that are matched in phase may vary with changes in the desired finished product pitch length, the amount of strain under which the product web is conveyed, the desired placement of discrete components, and other parameters affecting the distance between the two units, as measured in terms of product segment lengths.

As indicated, an example of these phase-sensitive cyclic operations is the application of discrete components. Because discrete components are typically shorter than the pitch length of a finished product, they are often formed by detaching segments from component webs that are fed more slowly than the main product web. These components, must then be accelerated, in order to avoid adverse effects on the process or the finished product, and must be phased properly before being applied. In addition, these components must often be pressed onto the product web in order to complete the process of their application.

Figure 3:
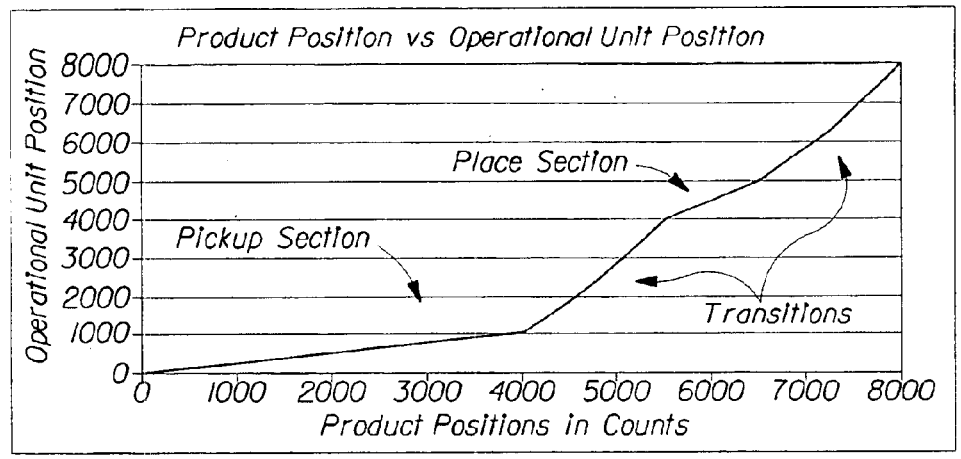
FIG. 3 shows a representative position profile for a servo-actuated pick (or pick up) and place operational unit for the application of discrete components.
Figure 4:
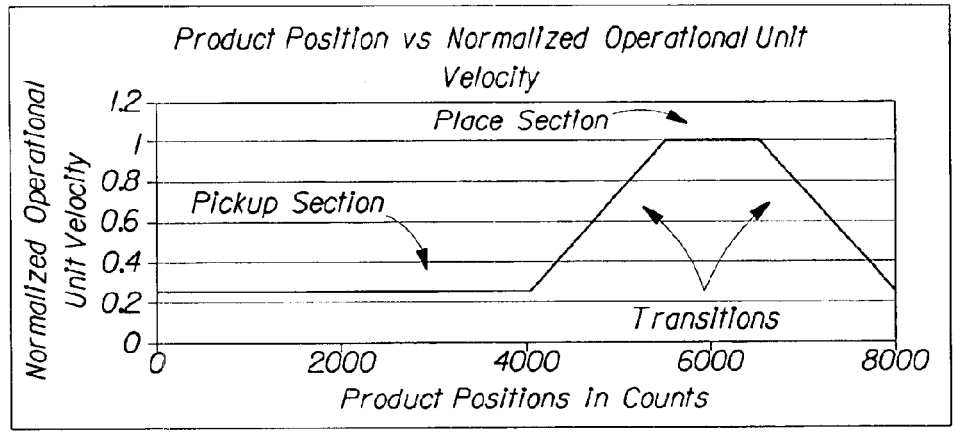
FIG. 4 shows a representative velocity profile for a servo-actuated pick (or pick up) and place operational unit for the application of discrete components.
Figure 5:
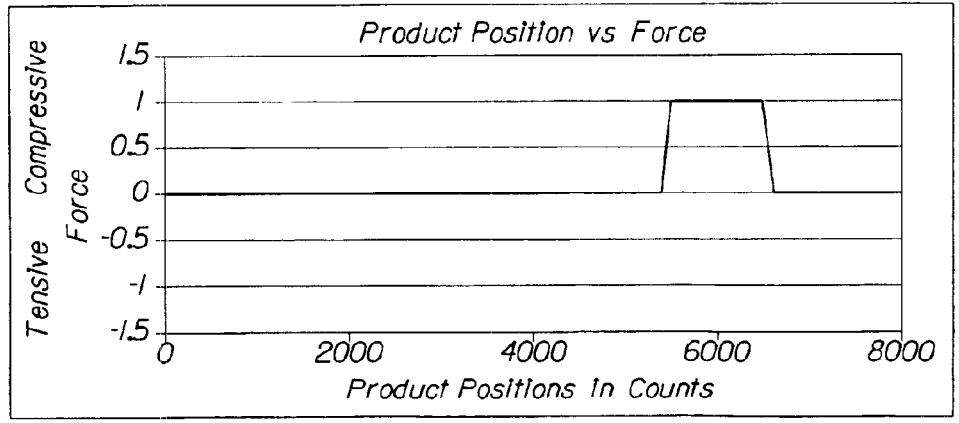
FIG. 5 shows a representative force profile for a servo-actuated pick (or pick up) and place operational unit for the application of discrete components.

FIGS. 3, 4, and 5 show representative position, velocity, and force profiles for an exemplary servo-actuated "pick" (or "pick up") and "place" operational unit for such an application of discrete components. In these exemplary figures, one operational cycle is representatively shown as occurring over 8000 counts in the operational unit's control system. During the pickup phase, the operational unit moves at a surface speed that is equal, or nearly equal, to the speed of the component web. During the place phase, the operational unit moves at a surface speed equal, or nearly equal, to the speed of the product web. In addition, during the place phase, the exemplary operational unit exerts a compressive force to complete the application of the discrete component. In the transitions between the pickup and place speeds, the servo is sped up and slowed down. In FIG. 3, the position profile is made up of operational unit position values corresponding to product positions. FIG. 4 shows a resulting velocity profile. Note that for simplicity of illustration, a normalized scale of the operational unit velocity is shown, in which a velocity that corresponds to the rate of advancement of the product web is denoted by "1" on the scale. In the force profile shown in FIG. 5, the neutral state in welch the operational unit is not controlled to exert either a compressive or a tensive force is denoted by "0" on the scale. The exertion of a compressive force during the place phase is represented by the force level above the neutral line in the chart, i.e., in the "compressive force" area of the chart.

In such an exemplary embodiment, the motion values, i.e., position, velocity, and/or acceleration values, as well as force values for the operational unit may be stored in tabular form in a controller, where a first reference column may contain product position values and a second column may contain operational unit values for a servo system. Alternatively, the position, velocity, and/or acceleration profiles may be defined in a set of equations that a controller can decode into a motion trajectory, based on a position of a master axis. Similarly, the force profile may be defined in a set of equations that a controller can decode into force levels, based on a position of a master axis.

Other examples of phase-sensitive cyclic operations include the cutting and removal of discrete portions of the composite product web and the severance of individual finished products. The machine motion, generation of torque, and/or exertion of force required for each of these operations must be phased properly and repeated accurately over consecutive products. Specific diaper manufacturing operations representative of those types already mentioned are the application of fasteners, the cutting and removal of side pieces to create side notches and thereby give the products an hourglass shape, and the severance of the finished products from the continuous composite product web at the end of the product formation process. The proper positional relationship of the fasteners, the side notches, and the final cuts is what gives the finished products their form and functionality. It is clear that an error in position could yield a defective product, for instance, one having the fasteners in the crotch area, lacking the hourglass shape, or even being severed through the absorbent core.

Figure 6:
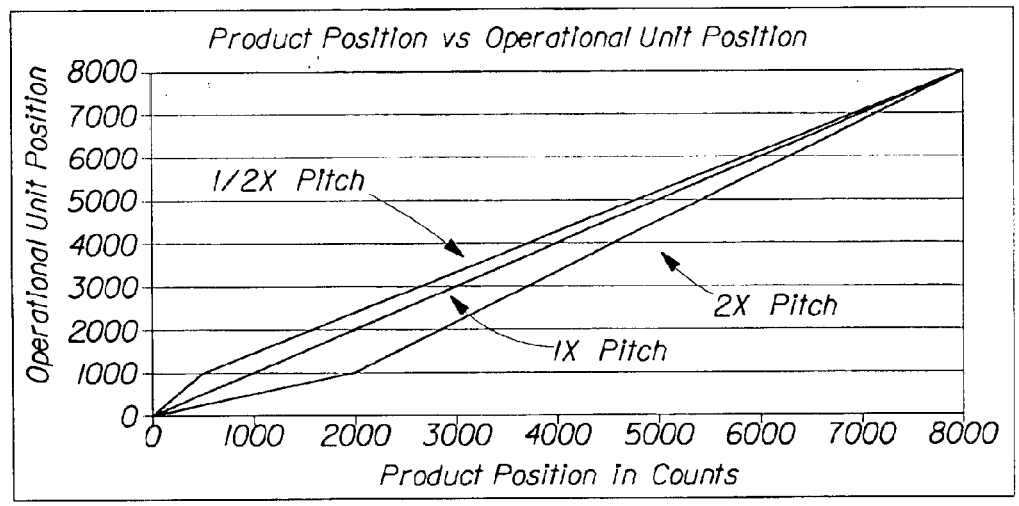
FIG. 6 shows representative position profiles for a phase-sensitive cyclic operation of an exemplary cutting unit of a given circumference, such as a rotary knife, in making products of three different pitches, or product segment lengths.
Figure 7:
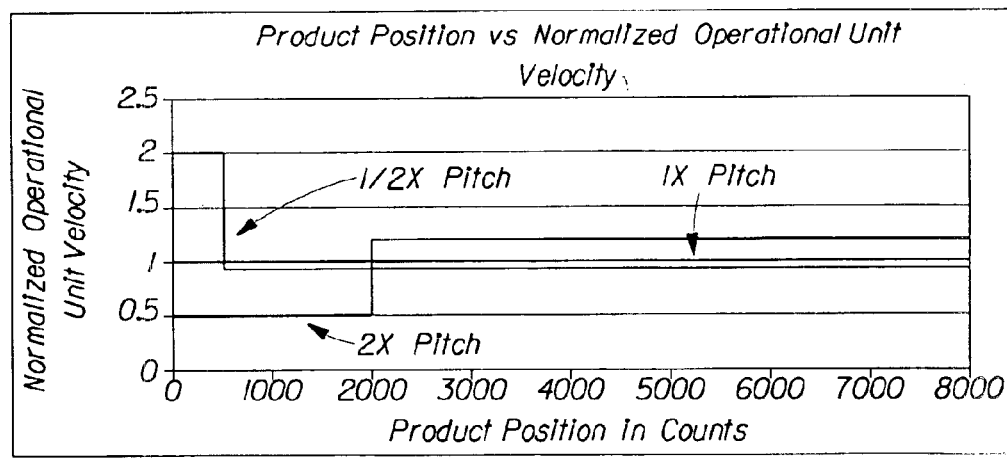
FIG. 7 shows a representative velocity profiles for a phase-sensitive cyclic operation of an exemplary cutting unit of a given circumference, such as a rotary knife, in making products of three different pitches, or product segment lengths.

FIGS. 6 and 7 show representative position and velocity profiles for the phase-sensitive cyclic operation of an exemplary cutting unit of a given circumference, such as a rotary knife, in making products of three different pitches, or product segment lengths. Again, one operational cycle is representatively shown as occurring over 8000 counts in the operational unit's control system. For a rotary knife, an operational cycle is simply the rotation between any two repeating points, such as from the completion of one cut to the next cut. Thus, a rotary knife making particular cuts in a product web will complete the same number of cycles per revolution as the number of these cuts that it makes per revolution.

As a first example, consider a rotary knife having a circumference equal to the product pitch and making a single cut per revolution. The position profile denoted by "1×pitch" in FIG. 6 shows that when the circumference is equal to one times the pitch, i.e., when the circumference equals the product pitch, a simple 1:1 ratio is maintained, such that when the product is at position 1000 the knife is at position 1000. For this example, also consider that the manufacturing apparatus operates at a constant rate and, therefore, the product web advances at a constant linear velocity. Because of the 1:1 ratio of movement of the knife to movement of the product web, FIG. 7 shows the rotational velocity of the cutting operational unit as being constant throughout the entire product cycle along the "1×pitch" profile. Note that for simplicity of illustration, a normalized scale of the rotational velocity is shown, in which a rotational velocity that corresponds to a tangential velocity of the knife equal to the rate of advancement of the product web is denoted by "1" on the scale.

In various embodiments, the tangential velocity of the knife may bear any preferred relationship to the linear velocity of the product web that is being cut. For instance, the tangential velocity of the knife may match the linear velocity of the product web, as in this example where the circumference of the knife equals the product pitch, or may differ from the velocity of the product web by a specified proportion and, thus, be greater or lesser than the velocity of the product web at the point of cutting.

Next, consider using the same knife unit of the given circumference to cut a product having a pitch that is twice the circumference of the knife while matching the tangential velocity of the knife to the linear velocity of the product being cut. Because the circumference of the knife is half the product pitch, the knife must rotate at twice the rate of the "1×pitch" example through the cut. However, after the cut has been made, the knife must rotate more slowly than previously in order to avoid making an extra cut and in order to arrive at the correct position for the next cut in phase with the next product segment. The position profile denoted by "½×pitch" in FIG. 6 represents this situation in which the circumference of the knife unit is half the product pitch. This position profile shows the rotational position of the knife changing at twice the rate of the position of the product for a first portion of the cycle during which the cut is made and then at a rotational rate less than that of the product for the remainder of the cycle. Correspondingly, the rotational velocity profile denoted by "½×pitch" in FIG. 7 depicts the rotational velocity of the operational unit at a normalized level of 2 for the first portion during which the cut is made and then at a level less than 1 for the remainder of the cycle. Of course, in order for the knife to complete one cycle in the exemplary 8000 counts, the integral of the rotational velocity during the cycle must equal one revolution, just as in the previous situation where the knife unit's circumference equaled the product pitch.

Finally, consider using the same knife unit of the given circumference to cut a product having a pitch that is half the circumference of the knife while matching the tangential velocity of the knife to the linear velocity of the product being cut. Because the circumference of the knife is twice the product pitch, the knife must rotate at half the rate of the "1×pitch" example through the cut. However, after the cut has been made, the knife must rotate more rapidly than previously in order to arrive at the correct position for the next cut in phase with the next product segment. The position profile denoted by "2×pitch" in FIG. 6 represents this situation in which the circumference of the knife unit is twice the product pitch. This position profile shows the rotational position of the knife changing at half the rate of the position of the product for a first portion of the cycle during which the cut is made and then at a rate greater than that of the product for the remainder of the cycle. Correspondingly, the rotational velocity profile denoted by "2×pitch" in FIG. 7 depicts the rotational velocity of the operational unit at a normalized level of 0.5 for the first portion during which the cut is made and then at a level greater than 1 for the remainder of the cycle. Of course, in order for the knife to complete one cycle in the exemplary 8000 counts, the integral of the rotational velocity during the cycle must equal one revolution, just as in the previous situations where the knife unit's circumference equaled the product pitch and equaled half the product pitch, respectively.

In general, cyclic operations typically include motion in the machine direction and in the vertical direction. For example, the application of a fastener often requires motion in the machine direction matching that of the target area of the particular product portion of the continuous product web on which the fastener is to be applied, in combination with motion in the vertical direction to place the fastener onto the target area. Similarly, some cutting operations, in addition to requiring motion in the machine direction matching that of the target area, also require motion in the vertical direction to effect the penetration and separation of the product web. Similarly, some cyclic operations include motion in the cross machine direction. For example, in some processes, a curvilinear, diagonal, or strictly cross machine direction motion may be required for the application of adhesives or of elastic elements, or for the folding or tensioning of structural elements of the article being manufactured.

Exemplary cyclic manufacturing operations requiring positional regulation and/or regulation of force include such operations as bonding, embossing, activating, perforating, severing, calendering, holding, smoothing, creasing, folding, sliding, rotating, reorienting, advancing, retarding, pleating, creping, thinning, spreading, aiming non-contact applicators, coating, etc. These operations may involve the programmed application of tensive force, compressive force and/or torsional force to a portion of a product segment, such as the composite product web, a discrete component destined to become a part of the composite product web, another web being folded around a discrete component, a film being wrapped or formed into a package to contain a finished product, etc. The programmed motion required for these operations may be linear, rotary, reciprocal, continuous, discontinuous, intermittent, uniform non-uniform, or any combination of these forms of motion. In addition to the examples listed here, many other potential applications of the present invention are known to those of skill in the art. The method of the present invention may be used to perform any of these cyclic manufacturing operations.

In the method of the present invention, such manufacturing operations are performed by operational units that are cyclically actuated by servo systems in response to a master reference signal. One cycle of the master reference providing this signal preferably corresponds to one product cycle and, in a manufacturing apparatus in which finished products are severed from a composite product web after being formed, one cycle of the master reference preferably corresponds to the severance of one finished product. The numerical value of the cyclical master reference preferably corresponds to the phase of the advancing product web at any point in the manufacturing apparatus or any operational unit. Thus, the cycle of the master reference can be identical for all pitches of product, such that only a programmed change in the motion profile for an operational unit's servo controller, as illustrated in the knife unit examples above, is required to change from one product pitch to another.

As is clear to one of skill in the art, in such an apparatus, the formation of one finished product from the various materials introduced along the length of the apparatus may occur over many product cycles and many cycles of the master reference. For example, a diaper manufacturing apparatus may have a length many times that of a segment of the composite product web corresponding to an individual product to be formed from the product web. In some embodiments, one cycle of the master reference may correspond to more than one product cycle or more than one cycle of the master reference may correspond to one product cycle. Even in these embodiments, it is preferable that an integer number of cycles of the master reference correspond to an integer number of product cycles, so that the correspondence of the numerical value of the cyclical master reference signal to the phase of the advancing product web is maintained.

The numerical cyclical master reference signal may be generated by a number of means known in the art, including an incremental or absolute position transducer such as an encoder or resolver, a virtual electronic encoder or electronic signal generator, or may be a series of computer generated numerical cyclical positions. The position of the master axis can be either transmitted digitally to the servo controller, determined by the servo controller via a method of counting a discrete number of pulses, or by reading an analog signal generated by the master position reference, or by various other methods known in the art.

Figure 8:
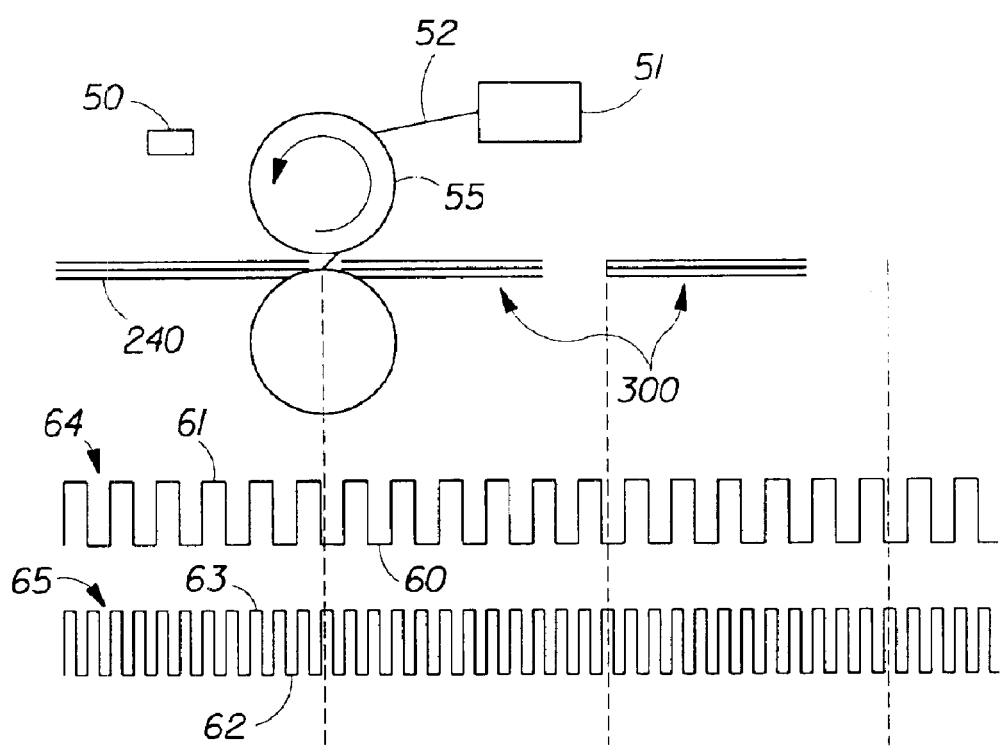
FIG. 8 depicts in additional detail the control of a phase-sensitive operational unit with respect to a master reference signal.

Returning to the previous knife unit example, FIG. 8 depicts in additional detail the control of such a phase-sensitive operational unit with respect to a master reference signal. The exemplary knife 55 is driven by a rotary servo drive 51 through a drive belt or gear drive 52 and rotates one revolution per product. As will be explained further, home sensor 50 senses the blade of the knife. The composite product web 240 advances into the knife where it is severed to form discrete products 300. The master reference signal in this example is depicted as pulse train 64. The minima and maxima of the pulses of the master reference signal are designated 60 and 61, respectively. In this example, one cycle of the master reference signal, corresponding to the advancement of one product segment of the product web, is 10 pulses in length. In practice, any discrete component that is cycled in phase with the product, regardless of the pitch of the discrete component, can be resolved with respect to the master reference, i.e., the master axis of the control system.

Pulse train 65 represents the operational unit position in FIG. 8, with the minima and maxima of the pulses designated 62 and 63, respectively. Any practical number of pulses 65 may represent the operational unit position within the product cycle, so long as this number is fixed for a given product and is representative of the motion of the operational unit. In this example, the number of pulses per cycle in the pulse train of the knife operational unit is twice that of the master reference signal, such that 20 position pulses occur per revolution. The consistent spacing of the pulses 65 in FIG. 8 represents a consistent frequency of the 20 pulses in the product cycle and this consistent frequency corresponds to a constant velocity, as in the situation described above in which the knife unit has a circumference identical to the product pitch. In some embodiments, this frequency may vary during the rotation as, for example, in situations such as those described above, in which the velocity of the knife is varied in order to make cuts in a product web having a product pitch different from the circumference of the knife unit.

In the method of the present invention, one of the phase-sensitive operational units may be used as a reference for the preliminary synchronization of another like unit. This synchronization may involve several steps and may begin with a homing procedure, in which an operational unit is reset to a predetermined physical starting state and its servo controller is reset to zero or another reference value. Homing is necessary when the phasing relationship of the operational unit to its servo controller is indeterminate. For instance, when a drive belt between a servo motor and a rotary knife is removed and replaced, the rotational position of the knife relative to the rotational position of the servo motor may change. The homing procedure restores the determinate phasing relationship of the operational unit to its servo controller.

The position of a operational unit as it relates to the position of its servo actuator can be determined by a sensor placed on the operational unit or its mechanical drive system. The sensor is designed to detect a unique state of the operational unit that occurs at a frequency of once per product, or any integral product multiple. The sensor can be a metal proximity, optical proximity, magnetic, or any digital or analog device, or system, capable of discerning a change as the operational unit moves. A physical "flag" that can be detected by the sensor may be provided on the operational unit or any part of its mechanical drive system. The "flag" can be any mark, indentation, or physical attribute of or on the operational unit or its drive system that can be used for the purpose of defining its home position.

An exemplary method of automatic homing begins with the provision of a signal from an operator or from a separate controller executing a series of logical programmed steps. Upon receipt of the signal, the servo is energized and the controller begins to move the servo actuator. When the "flag" turns the sensor on, the controller stops the servo actuator and then either advances or retards the servo actuator until the "flag" turns the sensor off. When the sensor is turned off, the controller marks the position of the operational unit as zero or another reference number in its internal memory. The position of the servo actuator is now referenced to an actual position of the operational unit.

It is often desirable to designate as the "home" state for an operational unit a particular state that is easy to verify or to attain. For instance, it may be desirable to designate as the home position for a cutting unit the point in its rotation at which the tip of a blade first contacts the surface of an anvil, with no web present. Similarly, it may be desirable to designate the home state for a fastener applicator as the point in its complex motion profile at which a vacuum head is fully retracted. However, it is not always practical to designate such states as home, especially when automatic sensing of the home state is desired. Because such automatic sensing may be achieved through the use of limit switches, proximity sensors, photoeyes, encoders, pressure sensors, torque sensors, force sensors, or other means of generating discrete signals when an operational unit reaches or is in a particular state, considerations such as the ease of maintenance and repair, the cost of parts, and the visibility of a component of interest may dictate a configuration of the automatic sensing means that, in turn, dictates the home state of the operational unit. For example, it may be more practical to sense the tip of the blade of the above cutting unit at a position well above the anvil than to invest in a complicated scheme to detect its first contact with the anvil. As a result, it is often not practical to simply designate as the home states of multiple operational units those states at which they are all in phase with a particular product web. Also, as noted above, any change in a parameter affecting the distance between two operational units, as measured in terms of product segment lengths, may also affect the difference between their states when phased to the same product web.

Hence, a phase offset is required in some instances, such as when simply homing two operational units does not suffice to match their phase, in which case a phase offset can be used to compensate for the difference between the home states of the two units. For example, in the case of two rotary operational units, it may be necessary to rotate one unit a number of degrees farther from its home angle than the other unit, in order to match their phase with respect to the same product web. Matching the phase of two rotary units may require such a phase offset because the distance between them is not an integral multiple of the segment length of the particular product being manufactured, because practical considerations mandate that their automatic sensing means be located differently, etc.

In principle, the phase offset of an operational unit is the difference between the home state of an operational unit and the state in which the operational unit is in phase with the advancing product segments of a product web. Thus, in principle, the magnitude of the phase offset is determined by comparison of the instantaneous position of the operational unit to the advancing product segments of the product web. In order to accomplish this in practical application, a position reference for the advancing product segments, i.e., a product position reference, must be chosen. The position reference for the product can be another operational unit on the manufacturing line, a virtual reference in a controller, a position sensor or sensing system providing a signal that is directly related to the position of the product, or the actual product web. The phase offset of the operational unit can be determined in many ways including, for example, by calculation as an offset from the product position reference, by manual entry by an operator as the product position is observed while the machine is running, or by the automatic entry of a digital or analog signal into the controller from a device or system that can determine the offset, such as a phasing, registration, or vision system. In such an automatic control system, a servo controller may initiate the phase offsetting of the operational unit upon the occurrence of certain logic states, including following homing, immediately prior to line start, or during line start.

It should be noted that homing is not always necessary for the synchronization of two operational units and that a phase offset can be used without homing. For example, if a manufacturing apparatus is run and the effect of a phase mismatch is observed in the product being made, the synchronization can be accomplished by offsetting the phase of the misphased operational unit by an amount proportional to the observed mismatch. This amount can be electronically stored and applied again, as in a situation in which the offset operational unit is homed for some reason. The application of the stored phase offset after homing may, thus, restore the prior condition of the operational unit being synchronized with the reference unit. Similarly, in situations such as a machine jam or a failure in a mechanical drive component, so long as the state of the operational unit remains determinate, i.e., so long as the servo system retains the ability to accurately monitor the affected operational unit, the stored phase offset can be restored. A phase offset may also be used for other purposes, such as when a change in the rate of production of the manufacturing apparatus or a change in a material affects the placement of a discrete component onto the product web. For instance, at a higher production rate, the velocity may be higher, and it may be necessary to advance or retard the actuation of an operational unit in order to maintain the same placement of the discrete component. An example is a linear actuator whose motion profile remains synchronized at a higher rate, but which performs an operation on a piece of material that is, itself, sensitive to velocity. If the resultant placement of the piece of material is effectively retarded in phase due to a higher velocity, then offsetting the phase to advance the actuation may restore the desired performance.

Regardless of whether homing and phase offsetting are necessary, the synchronization of the several operational units may require an adjustment of the phase of individual units. For example, if the reference unit is not in its homed state, but is still in a determinate state, then the synchronization in phase of other operational units may include their adjustment to match the phase of the reference unit. Thus, using the example of a rotary operational unit, its synchronization with a rotary reference unit may require it to be homed, phase offset, and further actuated to match the existing phase of the reference unit, or may require that only two or only the last one of these three steps be performed, based on the specific circumstances under which the synchronization is performed. For example, because each servo actuated operational unit is not rigidly coupled to a line shaft or other mechanical master axis, it is possible for the operational unit to become out of phase relative to the product position reference during a period when the line is stopped. Before or when the manufacturing line restarts, the operational unit must be synchronized so that good product, i.e., product that is within specifications, can be made.

A parameter of interest is the synchronization position error, which is the instantaneous difference between the position of the product position reference relative to its home state and the position of the operational unit being synchronized relative to its home state, as corrected by the phase offset for that operational unit. The following formula expresses this error arithmetically and can be programmed into the servo controller for calculation of the error:

Synchronization Position Error=Current position of product position reference−(Current operational unit position−operational unit phase offset)

Depending on the function, attributes, and properties of the operational unit, an appropriate method is chosen to eliminate the calculated synchronization position error. The method is typically chosen to be most effective and efficient in making the operational unit ready to make good product as soon as possible. Depending on the particular situation, an appropriate method may be to rotate or move the operational unit forward or backward prior to starting the manufacturing apparatus, or to start the manufacturing apparatus and eliminate the synchronization position error within the first rotations or movements of the operational unit.

Figure 9:
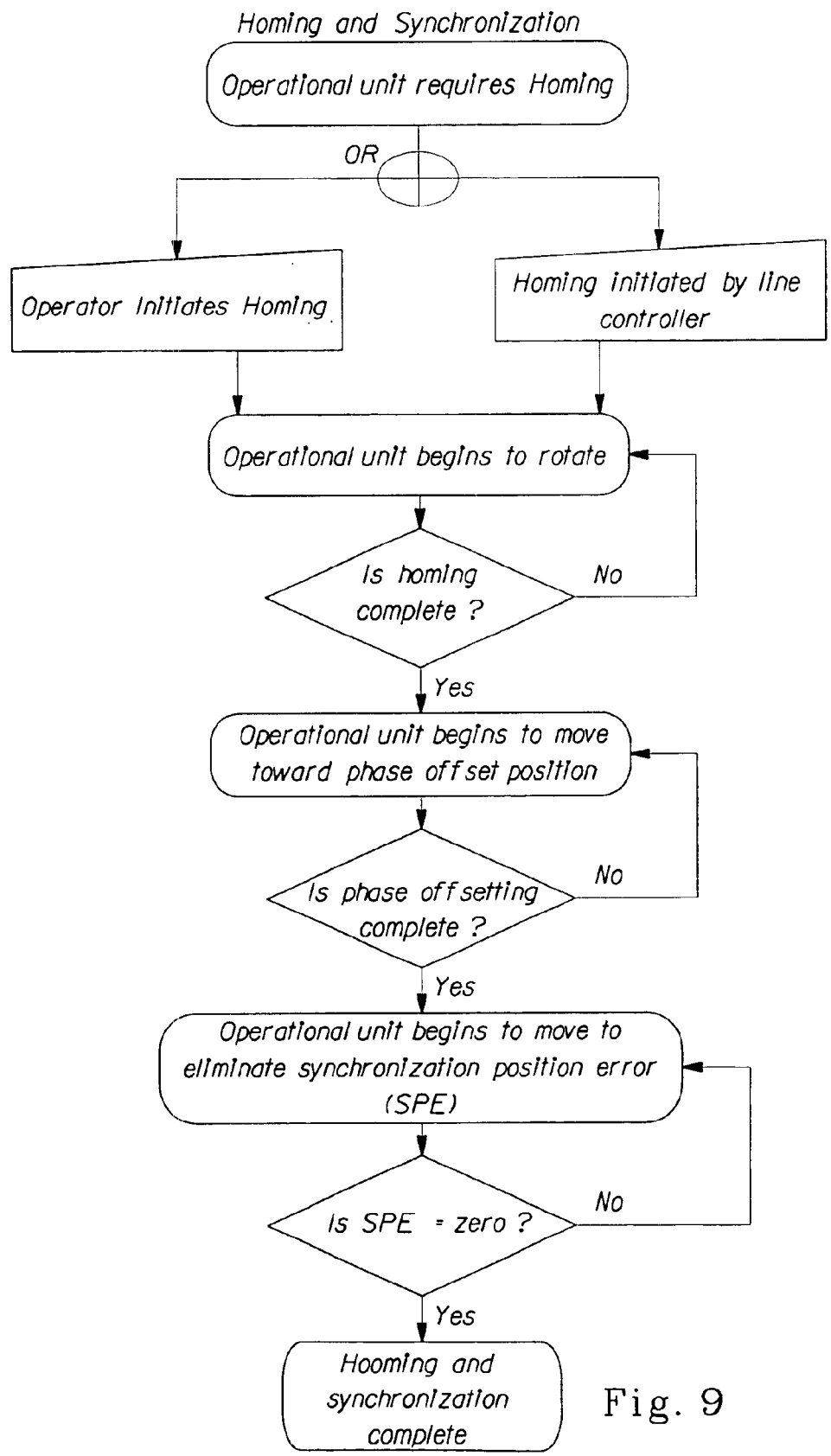
FIG. 9 shows a flowchart depicting a sequence of homing, phase offsetting, and phase matching procedures of the present invention.

FIG. 9 is a flowchart showing the sequence of the homing, phase offsetting, and phase matching procedures. When performed in the sequence shown, these procedures result in the servo controller resolving the position of the servo actuator and the position of the operational unit relative to the position of the product position reference. As shown in the flowchart, the servo actuator begins to move the operational unit in the homing procedure. While the operational unit is moving, the servo controller continuously inspects its input for a transition indicating that the homing step is complete. Following the homing step, the operational unit moves away from its home position by the amount of the phase offset, based on an amount that has been entered into the servo controller by an operator or an automatic device. Finally, the unit moves to eliminate the synchronization position error and thereby match the phase of the operational unit to the product position reference.

When the master reference signal has the form of a series of digital pulses, or another form of like functionality, the pulses may or may not be individually identified. If the pulses are not identified, then it may not be necessary to synchronize the reference operational unit and the master reference in phase. Instead, the several servo systems can simply respond to the receipt of each pulse by executing successive steps in the programmed trajectories for the actuation of their respective operational units. In other words, it may suffice to actuate the operational units in synchrony with the succession of pulses, without reference to the phase of the master reference. In embodiments using digital servo systems, these servo systems have the capability to follow such a master reference signal and the actuation of the operational units has the same period as the master reference. In addition, because the operational units are matched in phase, as described above, they have both the same period and phase, i.e., they are synchronized with respect to each other. Thus, from the upstream end of the manufacturing process to the downstream end, the synchronized servo actuated operational units operate in synchrony to form products from successive product segments of the product web.

When the master reference signal has the form of identified pulses or other like elements, it may be advantageous to synchronize the reference operational unit and the master reference in phase. For instance, in the case of a failure and a resultant stoppage of the manufacturing apparatus with the product web remaining unbroken, the master reference preferably remains in phase with the product segments that were previously formed in the product web. Following correction of the failure, so long as the reference unit's servo system has continuously monitored the state of the reference unit, the reference unit can be phased to the master reference and thereby be restored to proper phase with respect to the existing product web by eliminating the synchronization position error. Thus, the apparatus can be restarted without removing the existing product web, as would be necessary in order to prevent the production of defective products, were the reference unit out of phase. Conversely, if the monitoring has not been continuous, such as in the situation of a power interruption, it may be useful to phase the master reference to the reference operational unit, if the reference unit has remained mechanically in phase with the product web. In some situations, the most convenient way to synchronize the master reference and the reference operational unit may be to simply reset the master reference to its starting point and actuate the reference operational unit to its home state. Another approach to this synchronization is to actuate the reference operational unit and reset the master reference when the reference unit reaches its homed state.

Figure 10:
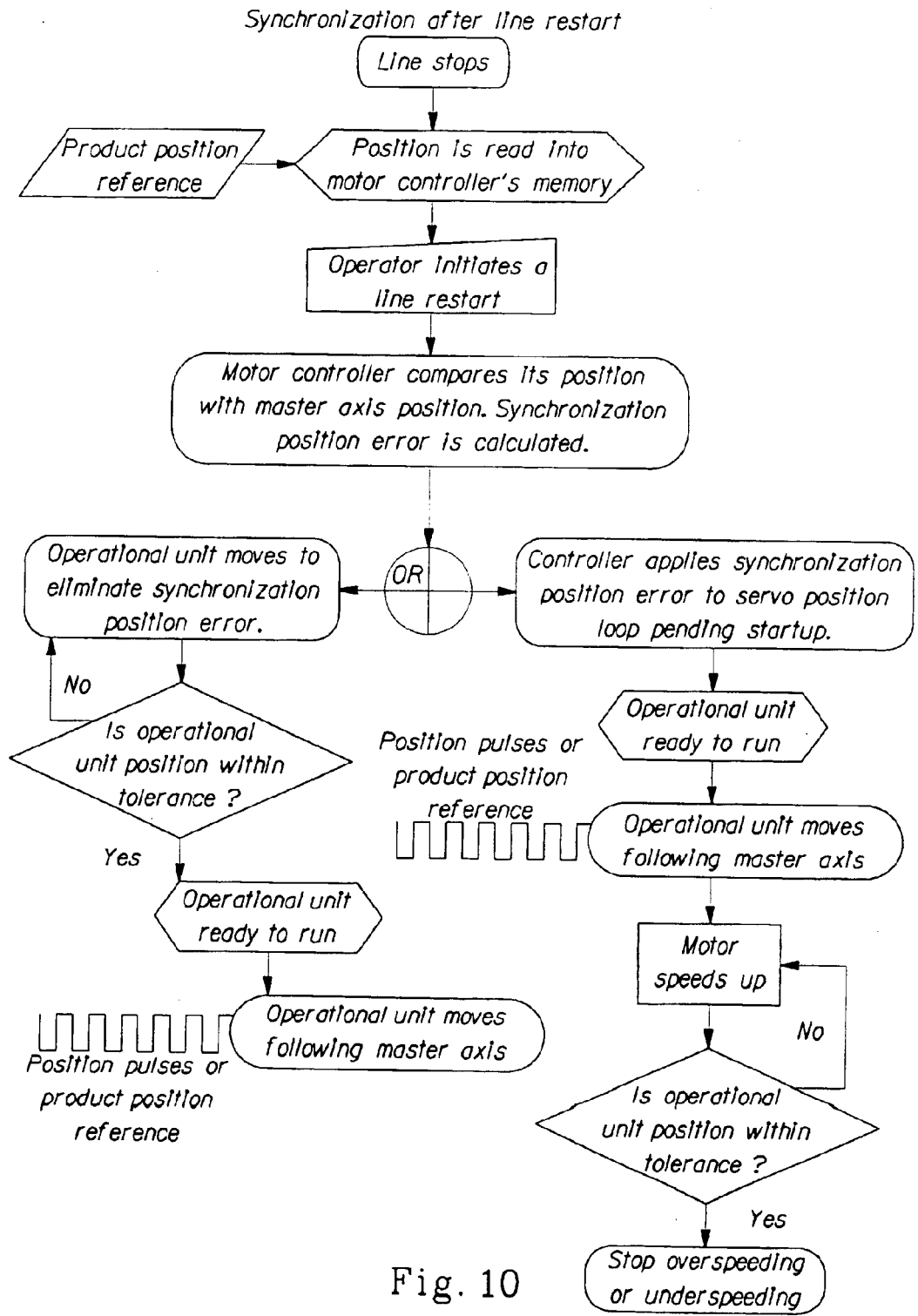
FIG. 10 depicts a sequence of steps by which the synchrony of an operational unit with the master reference, and therefore with the position of the previously formed product segments, can be reestablished after a servo actuator has been de-energized.

On a typical manufacturing apparatus, or line, there can be frequent stops and starts. When these stops occur, it is sometimes necessary to de-energize the servo actuators. When a servo actuator is de-energized, the position of the associated operational unit is no longer controlled, and the operational unit can move to a non-synchronous position relative to the product segments that were previously formed in the product web. FIG. 10 depicts a sequence of steps by which the synchrony of the operational unit with the master reference, and therefore with the position of the previously formed product segments, can be reestablished. For this sequence to be useful, it is necessary that the position of the operational unit be monitored while the servo actuator is de-energized and for the master reference to remain energized, as described above. The monitoring of the operational unit can be accomplished using various methods, for example, by the use of a position sensor that is rigidly coupled to the servo actuator, or by the use of a position sensor that is rigidly coupled to the operational unit. In either case, the position sensor must be capable of transmitting the position of the operational unit when the servo actuator is re-energized or continuously monitoring the position of the operational unit for use when the servo actuator is re-energized. When the operator initiates a restart of the manufacturing apparatus, the servo actuator is re-energized and the controller compares the position of the master reference to the position of the servo actuator or the operational unit, itself.

Two exemplary paths to elimination of the synchronization position error are shown in the flowchart of FIG. 10 and other variations are possible. Thus, once the synchronization position error is calculated, one of various approaches is used to nullify the error. The selection of the particular approach typically depends on the function of the operational unit and the characteristics of the process that the operational unit is performing. The criteria for selection include the desirability of nullifying the error as quickly as possible while having the least effect on the product web. For example, it may be preferable to eliminate the synchronization position error of a rotary knife while the unit is moving during the startup of the apparatus, rather than running the risk of inadvertently cutting the product web by moving the knife while the web is stopped. On the other hand, moving a non-contact device such as an adhesive spray nozzle is likely to present minimal risk of damaging a stopped product web, so the synchronization position error of such a device may be eliminated prior to startup.

In some situations, it may be necessary to perform all of the previously described procedures of homing, offsetting the phasing position, synchronizing the reference operational unit and the master reference, and synchronizing the remaining operational units with the reference unit. For instance, when starting up after a complete de-energization of the servo systems, the various phasing relationships may need to be reestablished. It also may be possible to automatically re-establish the positional relationship upon a machine restart by servo actuating the operational units and executing the above steps while the apparatus is in motion. Following the completion of the "pre-operational" synchronization steps described above, the servo systems function in concert with the master reference to maintain the synchronization of the servo actuated operational units during the ongoing operation of the manufacturing apparatus and thereby form the product segments of the product web into complete discrete products.

Having described the above exemplary cyclic operations for the purpose of introducing several pertinent fundamental concepts, it may be useful for understanding to describe certain elements of servo actuation and control systems as they may be utilized in the present invention.

Electric motors in programmable systems can be driven from any power source that is capable of delivering a modulated signal such that the motor force can be varied proportionally. In embodiments requiring rotary motion, the torque output of a motor can be controlled to deliver the required force. For linear motion, the thrust of a linear motor can be controlled to deliver the required force. The force signal is typically an electrical current that may be controlled by any of several known methods. The position of a operational unit driven by such a motor can be controlled in a variety of known ways and can be synchronized to a web process as described herein. A typical control system utilizes position feedback from the operational unit, the associated motor, or both. However, the position feedback device on the operational unit or on the motor may or may not be required if the position of the operational unit can be inferred by other means. A typical position feedback device is a transducer system incorporating an encoder or resolver, but any system capable of signalling the actual or inferred position of the operational unit can be used. The motor control system, which may be digitally controlled, supplies a proportional signal to the motor power supply that generates the modulated force signal.

The control system, power supplies, feedback devices, and motor devices, and any other components required for the purpose of producing and controlling the movement of an operational unit through servo-actuation, are herein referred to as the servo system for the operational unit. Suitable servo systems are capable of continuously controlling the position of the operational unit and thereby enabling synchronization of the operational unit with the advancement of the product web. Each operational unit may include one or more servo systems as necessary to produce the required motion or force. In some embodiments, rotary synchronization may be combined with linear synchronization to provide for processing discrete components while positioning these components for construction of the composite product web. In embodiments in which the synchronization of two or more servo systems is required, the individual servo systems may be synchronized with a common reference axis, such as a master reference axis. A servo system may, alternatively, be synchronized with another servo system.

A suitable drive reference system is capable of providing a signal from a master reference corresponding to the advancement of the product web to a drive controller. Each cycle of the master reference preferably corresponds to the advancement of an integral number of product segments, e.g., one cycle may correspond to one product segment. In an embodiment in which the master reference signal contains pulses, a given number of pulses may make up one cycle and, thus, correspond to one product segment. The frequency of the pulses may be used to determine the speed of the operational unit. In some embodiments, the master reference signal may contain absolute values and each value may represent an incremental advancement of the product web. In general, the servo system of the operational unit determines the reaction of the operational unit to each incoming pulse of the master reference signal.

It may be noted that the functions of the master reference and the servo system for an operational unit are generally not affected by the rate at which the manufacturing apparatus is operated. In particular, one cycle of the master reference can correspond to the advancement of the same number of product segments of the product web over a wide range of speeds. Similarly, the consistency of the correlation of the response of the operational unit to the advancement of the product segments is fundamentally limited only by physical constraints such as the torque capability of a particular servo motor.

However, in particular embodiments, it may be desirable to program a synchronized servo system to respond differently depending on the rate of operation, the velocity of the product web, or other factors. For example, it may be necessary for a bonding operational unit to exert a relatively high compressive force at a relatively low rate of operation in order to bond two materials at the desired level of strength. At a relatively higher rate of operation, the high level of force may be excessive and cause the materials to be punctured. Thus, it may be useful to synchronize this exemplary bonding unit in period and in phase while varying its absolute level of compressive force in inverse proportion to the rate of operation. Similarly, an operational unit performing a synchronized process involving a velocity mismatch or position mismatch during the handling or application of a discrete component may be actuated to produce a greater or lesser ratio of velocities or a greater or lesser absolute difference in velocity or position depending on, for example, the velocity of the incoming web. As another example, the phase offset of an operational unit may be varied in proportion to the operational rate in order to compensate for an effect related to velocity or acceleration and thereby avoid an apparent lag in the function performed by a machine component, such as a product diverter being moved by a servo actuator.

Servo systems that are suitable for application in the method of the present invention may be capable of utilizing any of a number of control methods and algorithms. For example, the position reference for the servo system may be a pre-calculated cam profile, continuously calculated profile, or a positional trajectory generation is algorithm, and may be either digital or analog based. Similarly, a motion trajectory for the operational unit may be based on a pre-calculated profile or a profile that is modified by the speed of the product web.

The motion required in typical operations for manufacturing absorbent articles is made up of multiple accelerations and infinitely variable velocities. The motion can be within the plane of the product web or outside the plane of the web. The mechanisms that perform these operations include knives, other cutters, printers, welders, ultrasonics, applicators, etc. The actuators can include various servo motors and DC or AC motors. A power amplifier comprising electronic equipment of sufficient power to provide the required torque and force to the mechanical mechanisms typically powers each servo motor. As the product web advances through the manufacturing apparatus, the controller for each servo actuator may provide a signal representing successive position profiles to the power amplifier to produce motion at a pitch that corresponds to the product segment length. The frequency of repetition of the position profile may be an integral multiple of the product rate, such that a cycle may occur at least once per product segment or at a rate that skips product segments at a constant rate or in a consistent pattern.

The servo controller may store a programmed table of previously calculated values corresponding to the position of the product segments as each passes through the operational unit and to the position of the operational unit, such that the position of the operational unit is phased to each product segment of the product web. In such a table, the values of the operational unit position are referenced to the values of the product position. The numbers are typically laid out in a tabular form of two columns with the first column containing the product position reference values and the second column containing the corresponding position values for the operational unit. The second column may alternatively contain corresponding values that represent velocity, torque, or force required to drive the operational unit. The profiles, represented in tabular form, can describe any of an infinite set of servo actuator torques or forces and velocities that fall within the capabilities of the servo, amplifier, and mechanical system. Such a "look up" table can have any size within the constraints of the servo controller. The resolution of the values within the table may be set at a particular level, based on the position resolution of the controller, the master axis generator, the scan time of the controller, and the update rate of the master axis position data, as well as requirements of the process being performed.

The following exemplary "look up" table of positional coordinates contains positional values for a master reference and corresponding values for a servo system controlling a operational unit. In general, a servo axis that the operational unit controller is programmed to follow is called a reference axis.

| Reference Axis Position Coordinates | Operational Unit Position Coordinates |
|---|---|
| 0 | 0 |
| 4000 | 2000 |
| 4500 | 2375 |
| 5500 | 4000 |
| 6500 | 6000 |
| 7500 | 7625 |
| 8000 | 8000 |

As the reference axis cycles through the values of the reference axis position coordinates, which are representative of the positions of the advancing product segments, the servo controller for the operational unit reads the reference axis position values and uses the corresponding operational unit position values from the table to actuate the operational unit along the programmed position profile. In particular, the operational unit position values contained in the table are calculated to produce the motion profile required by the process and are used in the trajectory generator in the servo controller to produce this motion. Because the values of the reference axis represent the positions of the pitched product segments within the product web, the process steps performed by the operational unit are synchronized to the formation of the successive product segments. Similar "look up" tables of torque and force values corresponding to product position reference values can also be used for the synchronized control of cyclic operations.

The values in the table can represent a gearing ratio between the reference axis and the servo system driving the operational unit and this ratio can be programmed to vary according to the position of the reference axis. For example, in the table above, in the range of the reference axis position from zero to 4000 counts, the operational unit moves 2000 counts for 4000 counts of the reference axis, yielding a gearing ratio of 1:2. In the range from 4000 to 8000 counts of the reference axis position, the operational unit moves from 2000 to 8000 counts for a total of 6000 counts of movement, yielding an average gearing ratio over this range of (6000/4000) or 1.5:1. Thus, this tabulated position profile is similar to the previously described profile in which the knife unit rotates at half the rate of advancement of the product web for a portion of each cycle.

As an alternative to the provision of pre-calculated coordinates in a table, a series of equations can be used to describe a motion profile as a function of the position of a reference axis. Any equation or series of equations describing the required motion as a function of a reference axis can be used as a position reference for a servo actuator. For example, trapezoidal functions, as well as other functions such as cycloids or nth order polynomials may be used in various embodiments.

While various embodiments and/or individual features of the present invention have been illustrated and described, it is clear to those skilled in the art that various other changes and modifications can be made without departing from the spirit and scope of the invention. As will also be apparent to the skilled practitioner, all combinations of the embodiments and features taught in the foregoing disclosure are possible and can result in preferred executions of the invention. It is therefore intended to cover in the appended claims all such changes and modifications that are within the scope of this invention.

What is claimed is:

1. A method for manufacturing discrete articles from a material web using at least first and second servo-actuated operational units, comprising the steps of:
   providing a signal from a cyclic virtual master reference;
   synchronizing the first operational unit and the second operational unit; and
   servo-actuating the operational units in response to the cyclic master reference signal to perform periodic operations on product segments of the material web and thereby form an integer number of the discrete articles over an integer number of cycles of the master reference.

2. The method of claim 1 further comprising the step of synchronizing the first operational unit and the master reference.

3. The method of claim 2 wherein the step of synchronizing the first operational unit and the master reference includes resetting the master reference to a starting point and homing the first operational unit.

4. The method of claim 1 further comprising the step of homing the second operational unit.

5. The method of claim 1 wherein the step of synchronizing the first operational unit and the second operational unit includes phase offsetting the second operational unit.

6. The method of claim 1 wherein the step of synchronizing the first operational unit and the second operational unit includes matching the phase of the second operational unit to the phase of the first operational unit.

7. The method of claim 1 wherein the step of synchronizing the first operational unit and the second operational unit includes homing the second operational unit, phase offsetting the second operational unit, and matching the phase of the second operational unit to the phase of the first operational unit.

8. The method of claim 1 wherein the periodic operations include an application of discrete components.

9. The method of claim 1 wherein the periodic operations include a cutting operation.

10. The method of claim 1 wherein the periodic operations include an application of force.

11. A method for manufacturing disposable absorbent articles from a material web using at least first and second servo-actuated operational units, comprising the steps of:
   providing a signal from a cyclic virtual master reference;
   synchronizing the first operational unit and the second operational unit; and
   servo-actuating the operational units in response to the cyclic master reference signal to perform periodic operations on successive product segments of the material web and thereby form an integer number of the disposable absorbent articles over an integer number of cycles of the master reference.

12. The method of claim 11 further comprising the step of synchronizing the first operational unit and the master reference.

13. The method of claim 12 wherein the step of synchronizing the first operational unit and the master reference includes resetting the master reference to a starting point and homing the first operational unit.

14. The method of claim 11 wherein the periodic operations include an application of discrete components.

15. The method of claim 11 wherein the periodic operations include a cutting operation.

16. The method of claim 11 wherein the periodic operations include an application of force.

17. The method of claim 11 wherein the step of synchronizing the first operational unit and the second operational unit includes homing and phase offsetting the second operational unit.

18. A method for controlling servo-actuation of at least first and second operational units in an apparatus for manufacturing disposable absorbent articles, comprising the steps of:

provinding a signal from a cyclic virtual master reference;

synchronizing the first operational unit and the second operational unit;

providing programmed servo-actuation instructions for the operational units; and executing the instructions in response to the cyclic virtual master reference signal to servo-actuate the operational units and thereby form an integer number of the disposable absorbent articles over an integer number of cycles of the master reference.

* * * * *

UNITED STATES PATENT AND TRADEMARK OFFICE
CERTIFICATE OF CORRECTION

PATENT NO. : 6,869,386 B2
DATED : March 22, 2005
INVENTOR(S) : Michael Joseph Lamping et al.

It is certified that error appears in the above-identified patent and that said Letters Patent is hereby corrected as shown below:

Column 8,
Line 3, please delete "welch" and insert therefor -- which --.

Signed and Sealed this

Thirteenth Day of December, 2005

JON W. DUDAS
*Director of the United States Patent and Trademark Office*